Sept. 20, 1927.
J. C. MILLER
1,643,254
WELDROD AND PROCESS OF ARC WELDING WITH THE SAME
Filed May 12, 1924
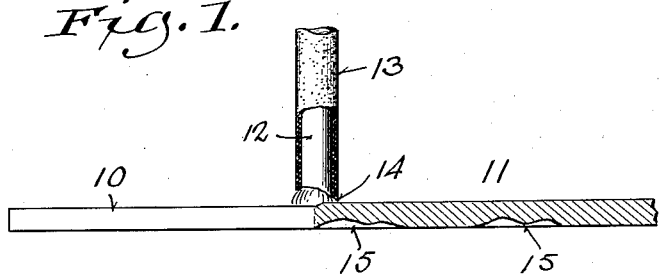
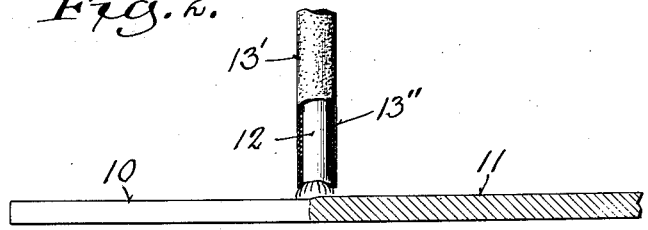
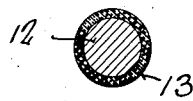
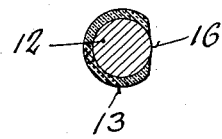
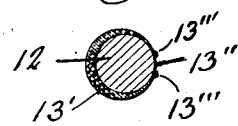
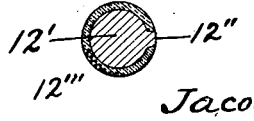
INVENTOR.
Jacob C. Miller,
BY
Erwin, Wheeler & Cleveland
ATTORNEYS.
WITNESS:
Fred Palm Patented Sept. 20, 1927.

1,643,254

UNITED STATES PATENT OFFICE.

JACOB C. MILLER, OF MILWAUKEE, WISCONSIN, ASSIGNOR TO A. O. SMITH CORPORATION, OF MILWAUKEE, WISCONSIN, A CORPORATION OF NEW YORK.

WELD ROD AND PROCESS OF ARC WELDING WITH THE SAME.

Application filed May 12, 1924. Serial No. 712,591.

The invention relates to metallic arc welding, in which a fusible weldrod is employed to conduct the arcing current, and which in addition to that function constitutes a means for supplying welding material to the welded joint, such welding material being produced in the progressive fusion of the weldrod, in a manner which is now well known.

The most satisfactory results are attained in metallic arc-welding by the use of a weldrod which is provided with a heat resisting but combustible covering of chemically treated paper, pulp, or other substance, which is consumed by the arc and falls away in about the ratio of the consumption of the weldrod. Such covering substance, which is approximately uniform in thickness and concentric to the wire which it surrounds, may be applied by wrapping in case paper is used, or by compacting the plastic about the weldrod in case pulp is used, or by dipping the weldrod into a semi-fluid or plastic mass in order to apply thereto a suitable covering of the nature specified. As thus treated, the weldrod is provided with a covering which completely embraces its longitudinal surface.

Despite the use of automatically-operating control devices for effecting and maintaining a stabilized welding current, the action of the arc has at times been erratic and has occasionally failed to produce a uniform weld, even under the most favorable conditions with perfect adjustment of the arc control-devices. As a result, the welded joint has sometimes been imperfect in portions thereof.

In my studies conducted with a view to the ascertainment of the reasons for the erratic action of the arc, I have discovered that occasionally the evenly applied covering of the weldrod does not burn away uniformly, and that at the rear side of the weldrod there is formed a downwardly projecting carbonized portion of the covering which at times will contact with the part of the joint last welded, and form a conductor for part of the current, thus weakening the arc to a considerable degree and detracting from its efficiency. This formation of the irregular projection at the lower rear end of the covering of the weldrod is due to the fact that the colder metal in front of the welding point is a better conductor than is that of the hot metal at the rear of such point. In consequence of this condition, the arc flows from the front side of the weldrod and sometimes burns away the covering material at that side faster than it does the covering material at the rear side, so that the carbonized depending projection before referred to is formed. But when the covering burns evenly and uniformly in circumferential zones, the defect does not exist.

In order to meet the exigencies of the situation, I have devised a special construction of weldrod in which the covering is not concentric with the wire as heretofore, but is eccentric thereto, so that such wire has upon one of its longitudinal sides a comparatively thin covering or coating. In using the improved weldrod, the thinly covered side is arranged at the rear, that is, so that such thinly covered side always faces the portion of the welded joint which has been completed. By this arrangement, there is so little of the covering at the rear of the weldrod that there is not present at any time enough of the covering material to permit the formation of the carbonized depending projection before referred to. Consequently, the covering will burn and fall away with regularity, and in even circumferential zones. In this manner I am enabled to eliminate the causes which have heretofore contributed to the diversion and weakening of the welding current, with the resultant imperfectly formed welded joint, so that the arcing current is not subject to the erratic variations in its intensity previously experienced, and so that the whole of the welded joint is produced with uniformity in the structure thereof.

The results desired can be secured with completely covered weldrods by grinding away or by other means removing all or a part of the covering from one longitudinal side of the weldrod so as to expose a bare rear side or with a portion of the coating so thin as to constitute a substantially bare rear side. Likewise, the results can be obtained by forming one side of the weldrod as an entirely bare surface, without any of the covering material thereover, and such bare side may also be constituted as a raised rib extending longitudinally of the wire, with the covering material compacted about the other longitudinal sides of the wire.

The novel features will be pointed out in the appended claims.

The drawing herewith delineates the features residing in the invention. In such drawing:

Figure 1 is a conventional showing of the ordinary practice of metallic arc welding, in which a fully covered or coated weldrod is used.

Fig. 2 is a similar view showing the practice of welding in accordance with my improved method.

Fig. 3 is a transverse sectional view through a covered weldrod of usual concentric construction.

Fig. 4 is a like view of such a specially constructed weldrod having its covering eccentrically disposed about the wire, in accordance with my invention.

Fig. 5 is a like view of an ordinary weldrod, such as shown in Fig. 3, and having the covering at its rear side removed.

Fig. 6 is a like view of a further modification of my principal invention, and shows a weldrod wire produced with a longitudinal rib to present a bare rear side, with the covering impacted upon the other sides of the wire.

In the drawing, the numeral 10 indicates the work to be welded, and the numeral 11 that portion of the welded joint already effected or completed. The wire or rod 12, as hereinbefore stated, is provided with a covering or coating 13, which may be applied in any desired manner and be formed from any suitable material, as paper, pulp or other substance. The covering or coating is placed circumferentially about the wire and has the form of an elongated tube or sheath having a concentric arrangement with relation to the wire which it encloses. The material of which the covering is formed is impregnated with a resistant which will retard combustion and permit the formation in the end of the covering of a crater out from which the molten metal produced by the fusing of the wire will be ejected. The chemically treated covering burns at a slower rate than does the wire.

Theoretically, the covering or coating 13 should burn away evenly in circumferentially extending zones as the wire is melted, but it does not always do so in actual practice. The greater conductivity of the cooler metal in the unwelded portion of the work, as compared with that which has been heated in the welding operation and already welded, tends to the formation of the arc at the front of the weldrod, that is, toward the unwelded portion of the joint, and such formation of the arc at the front is conductive to an uneven combustion of the covering so that at periods the same burns irregularly, producing at such times a downwardly projecting carbonized portion 14, at the rear side of the weldrod, which will contact with the work and establish a circuit that will conduct away a portion of the arcing current, and so impair the value of the latter that the metal comprising the work is not penetrated by the heat in the degree necessary to effect a complete fusion thereof. Consequently, the work will be imperfectly welded in those portions where the action of the arc has been erratic in the welding, as indicated at 15, in Fig. 1.

In order to overcome the difficulties adverted to, it is my purpose to produce a weldrod in such form that the thickness of the covering upon the rear side will be so materially less than that upon the other sides of the wire, that the formation of the projection will be avoided or prevented. This result I achieve preferably by providing the wire 12 with a covering 13′ which, instead of being concentric thereto, as in Figs. 1 and 3, is eccentric thereto, as in Figs. 2 and 4, so that one side of the weldrod wire is substantially bare. The arrangement is best shown in Fig. 4, in which the relation of the elements is clearly illustrated.

In constructing the special weldrod shown in Fig. 4, the covering in the form of a plastic which is saturated with the chemicals necessary to produce the desired conditions in connection with the welding arc, is applied to the wire by pressure. In its passage through the stuff chest containing the mixture, the wire 12 is guided so that as it emerges from the outlet of the stuff chest, a thin layer only of the plastic is permitted to attach itself thereto at one side, as indicated at 13″, with a gradual increase in the thickness of the covering until the opposite side is reached. The thinly covered rear side 13″ of the weldrod should be positioned so as to face the welded portion of the joint. In order to enable such positioning of the weldrod to be effected with facility, I have provided a marker for indicating the location of the thinned portion of the covering. Such marker consists in a longitudinal rib 13‴, which is produced by providing a shallow groove in the surface of the outlet in proximity to the line in which the thinned portion of the covering is applied to the wire. A plurality of such marking ribs may be created, if desired.

In the case of fully covered weldrods of the type shown in Fig. 3, which may be in stock, these may be adapted to the purposes of my invention by removing a portion or all of the covering at one longitudinal side of the wire 12, so as to present a bared or substantially bared surface, as 16. The covering will then be consumed evenly, and the full strength of the arcing current will pass to the work. There being no covering at the rear side of the weldrod, the current dissipating projection 14 cannot be formed, and therefore the arc will maintain its unimpaired maximum value at all times, and effect such complete fusion as to produce a perfect weld thoughout the line of the joint. As before, the bare side 16, which is a marker in the sense of the rib 13''', must always be positioned so as to be at the rear, with the covered portion at the front. In other words, it must always face the completed portion of the welded joint, to obtain the desired results. Such removal may be effected by grinding or cutting off a portion of the covering so as to produce the bare rear side upon the wire.

In Fig. 6 I have shown a modification of the invention in which a specially prepared wire 12' is provided longitudinally with an integral rib 12'', which latter feature is designed to present the bared position indicating or marking surface. The remainder of the surface of the wire may have a coating 12''' compressed and impacted thereon. Also, the coating or covering may be applied by dipping the wire into a semiplastic mass, and then wiping off a portion of the adhering material so as to produce a bare side.

For the purposes of my invention, the weldrod may be produced with an eccentrically disposed covering which presents a thin or comparatively thin coating at one side, or such side may be bare or substantially bare, even though the covering be concentric to the wire. I regard all of these constructions as within the scope of my invention, the purposes of which have been hereinbefore defined. By the references in the claims to the "substantially bare" side of the weldrod, I mean to include those constructions in which one side of the weldrod is entirely bare, inasmuch as the terms "bare" and "substantially bare" are synonymous as applied to the present invention, in which a highly desirable result is attained irrespective of the particular form of the instrumentalities employed. In the treatment of the weldrods, some may be produced with an entirely bare rear side, while others subjected to the same treatment might be produced with a thin covering which would give them a substantially bare rear side. But in every case, the covering at the front side of the weldrod is substantial in comparison with that at the rear. The extent of the latter may vary even to the point of absence and still embody my invention.

By using current controlled, automatically operating feeding devices for the weldrod, the arc will be stabilized and flow with the same intensity during the whole of the welding operation, so as to fuse equally all areas of the welding region and produce a perfectly welded joint, inasmuch as the present invention obviates the conditions which heretofore have contributed to the production of defective welded joints.

Having thus described my invention, what I claim and desire to secure by Letters Patent of the United States, is:

1. As a new manufacture, a weldrod comprising a wire and an eccentrically disposed impregnated covering thereon to retard burning, such covering being arranged to expose a substantially bare rear side upon the wire, the said covering being provided with a marker formed as a longitudinal rib for indicating the location of the bare side.

2. As a new manufacture, a weldrod comprising a wire and a covering thereon impregnated to retard combustion, such covering being thin upon one side of the wire and thick upon the other, the said covering being provided with a marker formed as a longitudinal rib for indicating the location of the thin side.

3. As a new manufacture, a weldrod comprising a wire provided with a covering which is thick upon one longitudinal side of the wire and comparatively thin upon the other, the said covering being provided with a marker formed as a longitudinal rib for indicating the location of the thin side.

4. The process of arc welding, which embodies the preparation of a weldrod substantially bare at the rear side and covered at the front side, arranging the substantially bare side toward the rear of the line to be welded, and fusing the weldrod by means of an arcing current, whereby the arc is stabilized and flows with the same intensity during the welding operation.

5. The process of arc welding, which embodies the preparation of a weldrod substantially bare at the rear side and covered at the front side with an impregnated substance to retard combustion of the covering, arranging the substantially bare side toward the rear of the line to be welded, and fusing the weldrod by means of an arcing current, whereby the arc is stabilized and flows with the same intensity during the welding operation.

6. The process of arc welding, which comprises the preparation of a weldrod with an eccentrically disposed covering which is thick upon one side of the wire and comparatively thin upon the side opposite thereto, arranging the substantially bare side toward the rear of the line to be welded, and fusing the weldrod by means of an arcing current, whereby the arc is stabilized and flows with the same intensity during the welding operation.

7. The process of arc welding, which comprises the preparation of a weldrod with an eccentrically disposed covering which is thick upon one side of the wire and comparatively thin upon the side opposite thereto, arranging the thinly covered side toward the rear of the line to be welded, and fusing the weldrod by means of an arcing current, whereby the arc is stabilized and flows with the same intensity during the welding operation.

In testimony whereof, I have signed my name at Milwaukee, this 7th day of May, 1924.

J. C. MILLER.